(12) United States Patent
Jones

(10) Patent No.: X9313
(45) Date of Patent: Jan. 11, 1836

(54) DRILLS FOR METAL

(76) Inventor: William Ray Jones

William Ray Jones of Granville N.Y.
Letters Patent No 12. Dated January 11th 1836.

The schedule referred to in these Letters Patent and making part of the
[illegible], Containing a description in the words of the said William Ray Jones himself
[illegible] improvement in the Drill for drilling wood, metal and Stone.

Be it known that I William Ray Jones of the Town of Granville in
[illegible] county of Washington and State of New York have made an improvement in the
[illegible] for Drilling wood metal & Stone which is described as follows
This drill consists of the mandrill, the screw with the crank on
top of it; and another on the mandrill.
The mandrill is made of Metal & hollow at the lower end to re-
[illegible] the drill, on the lower end is a head or shoulder against which the screw presses.
[illegible] screw is made of wood or metal and hollow to receive the mandrill & turns in
[illegible] in the frame, On the top of the screw is a crank for pressing it down upon the
[illegible]ndrill with the drill.
The whole is supported on a proper frame. Operation. The sub-
[illegible] to be bored is placed upon the lower part of the frame, the drill is brought
[illegible] contact with it by turning the screw with the crank, the mandrill with the
[illegible] is then turned by the crank which bores the hole required.
What I claim as my invention and desire to secure by Letters
[illegible] is the before described crank on the end of the screw passing through the nut, and the
[illegible] pressing upon the shoulder of the mandrel whilst boring by turning the crank.

Witnesses,
Wm P. Elliot.
John Sidlford.

350 words

William R. Jones.

Rec'd and Recorded anew March 11, 1867.